April 11, 1961 F. PSCHIBUL 2,978,729
REVOLVING WINDSHIELD WIPER
Filed April 19, 1957 3 Sheets-Sheet 3

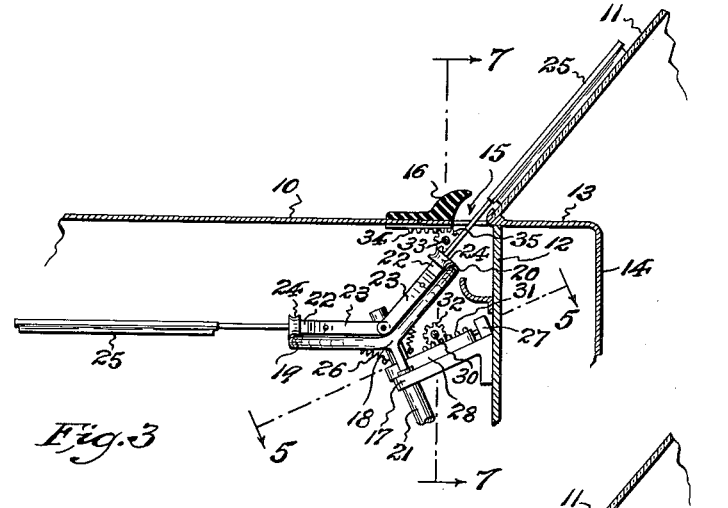

INVENTOR.
Franz Pschibul,
BY Richards & Cifelli,
Attorneys

UNITED STATES PATENT OFFICE 2,978,729
Patented Apr. 11, 1961

2,978,729

REVOLVING WINDSHIELD WIPER

Franz Pschibul, Jersey City, N.J.
(Veterans Administration Hospital, East Orange, N.J.)

Filed Apr. 19, 1957, Ser. No. 653,779

4 Claims. (Cl. 15—250.16)

This invention relates to windshield wiper mechanism for automobiles.

This invention has for an object to provide a windshield wiper mechanism the wiper blade or blades of which, when operative, are driven to revolve through a full circular path of travel, and in such guided manner that in the upper half of the travel path the same make wiping contact with the windshield surface, but in the lower half of said travel path the same pass beneath the hood of the automobile, and, when inoperative, said wiper blade or blades are brought to rest beneath said hood, thus being entirely removed from the windshield so as to permit unobstructed vision through the latter, while at the same time being both concealed and protected by said hood; the revolving blades being adapted to be driven at high speed so as to be substantially invisible, whereby, in use, to offer but minimum interference with vision through the windshield.

The invention has for another object to provide means to open and close a passage between the automobile hood and the windshield through which the revolving wiper blade or blades may pass in and out of the hood interior to and from wiping contact with the windshield.

Another object of this invention is to provide manually controlled means which functions, in one position, to first open the wiper blade passage and then start operation of the wiper mechanism, and, in another position, to first stop operation of the wiper mechanism and then close the wiper blade passage.

A further object of this invention is to provide means to so arrest motion of the wiper blade or blades, when operation thereof is stopped, that the same will come to rest in a predetermined concealed position within the automobile hood interior.

The above and other objects will become apparent from a reading of the following detailed description of an illustrative embodiment of this invention in connection with the accompanying drawings, in which:

Fig. 3 is a fragmentary longitudinal vertical sectional view, taken on line 3—3 in Fig. 1; and Fig. 4 is a similar view, taken on line 4—4 in Fig. 2.

Fig. 5 is a fragmentary horizontal sectional view, taken on line 5—5 in Fig. 3, but drawn on an enlarged scale; and Fig. 6 is a similar view, taken on line 6—6 in Fig. 4, but also drawn on an enlarged scale.

Figure 7:
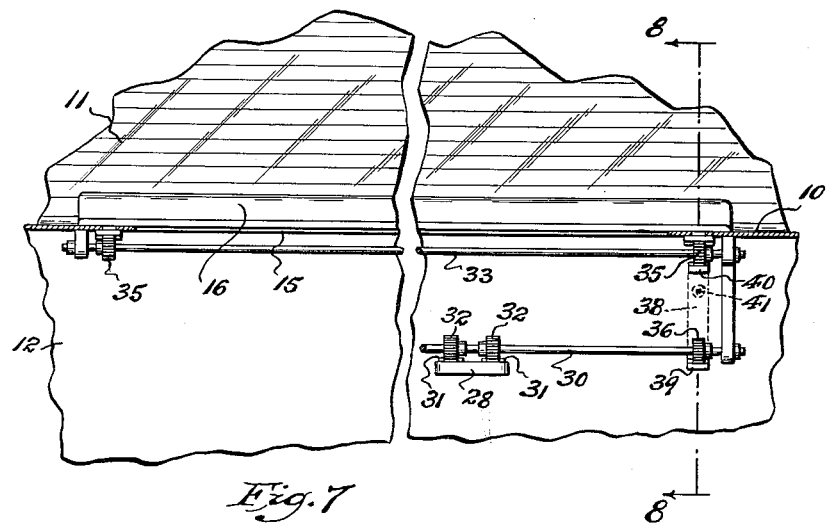
Figures 8, 9:
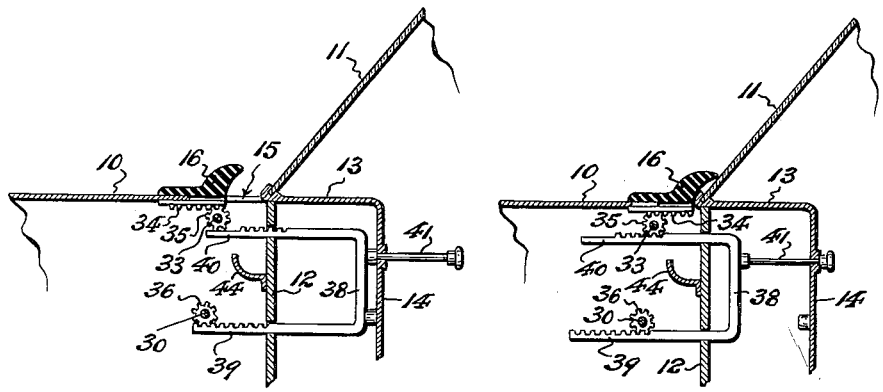

Fig. 7 is a fragmentary transverse vertical sectional view, taken on line 7—7 in Fig. 3; Fig. 8 is a longitudinal vertical sectional view, taken on line 8—8 in Fig. 7, showing the closure between the automobile hood and windshield open and the power switch which controls the operation of the wiper mechanism closed; and Fig. 9 is a similar view, showing said closure closed and said power switch open.

Referring to the drawings, in which like characters of reference indicate corresponding parts, the reference character 10 indicates the hood of an automobile, 11 indicates the windshield disposed angularly to and above the hood, 12 indicates the hood back board, and 13 the cowl having a perpendicular wall 14 which ordinarily serves as an instrument board or panel within the automobile body interior.

At its juncture with the windshield 11, the hood 10 is provided with a transversely extending opening, of suitable length and width, which provides a passageway 15 through which revolving wiper blade members may pass out of the hood interior, thence across the exterior face of the windshield 11, and then back into said hood interior, as will presently be more particularly described. A movable closure member 16 is provided for opening and closing the passageway 15.

Supported within the hood interior by a mounting bracket 17, which is affixed to the hood back board 12 in forward extension therefrom, is a wiper blade guide track member 18 of circular form, but comprising angularly related forward and rearward half sections. The forward half section 19 is disposed in a horizontal plane substantially parallel to and beneath the top of the hood 10, while the rearward half section 20 is disposed in an uptilted position in a plane substantially parallel to the inclined plane of the windshield 11.

Journaled in the mounting bracket 17, to extend upwardly therethrough and centrally through the guide track member 18, is the drive shaft 21 of a windshield wiper mechanism. Pivotally connected with the upper end of said drive shaft 21, on a transverse axis above the guide track member 18, is at least one wiper blade carrying lever arm 22, the same having a bifurcate inner end or yoke portion 23 which straddles the drive shaft 21 in pivotal connection therewith, and so as to extend radially from said shaft over the guide track member 18. Rotatably mounted on said lever arm 22 is a guide roller 24 which rides upon the guide track member 18. Extending from the free end of the lever arm 22, exteriorly of the guide track member 18, is a wiper blade member 25. The lever arm 22 and its guide roller 24 is biased toward the guide track member 18 by a pull spring 26, which is interconnected between the lever arm 22 and the drive shaft 21. If desired, a similar but oppositely extending lever arm 22, guide roller 24 and wiper blade member 25, biased toward the guide track member 18 by a pull spring 26, may be provided, whereby to increase the windshield wiping action of the wiper mechanism.

The drive shaft 21 may be driven by and from any suitable power source. For example, and perhaps preferably, the same may be driven by an electric motor (not shown).

In a simple arrangement, the closure member 16 may be opened manually, whereafter power can be applied to the drive shaft 21 for rotating the same. When the drive shaft 21 is rotated, the lever arm or arms 22 will be revolved so as to traverse the guide track member 18, whereby to continuously revolve the wiper blade member or members 25. As the lever arm or arms 22 traverse the forward half section 19 of the guide track member 18, the same, and the wiper blade member or members carried thereby, will travel within the interior of the hood 10 beneath the top thereof, but, as said lever arm or arms 22 engage and traverse the uptilted rearward half section 20 of the guide track member 18, the same, and the wiper blade member or members carried thereby will be upswung to pass upwardly through the passageway 15, thence across the exterior face of the windshield 11 in wiping contact therewith, and thence back through said passageway 15 into the interior of the hood 10, all in continuous and repeated revolution while the wiper mechanism is operative. It will be understood that, since the wiper blade or blade members are continuously revolved in a given direction when the wiper mechanism is operative, the same may be so revolved at a high speed so that they become substantially invisible, whereby they offer but minimum interference with vision through the windshield. When operation of the wiper mechanism is discontinued, the wiper blade member or members 25 are adapted to be brought to rest within the interior of the hood 10, whereafter the closure 16 can be closed.

In a preferred embodiment of this invention, manually operable means is provided for effecting the opening and closing movements of the closure member 16 respectively in timed relation to switch operations for closing and interrupting a circuit by which electric motor means for driving the wiper mechanism can be started and stopped. To this end, a suitable make and break switch 27 is connected in circuit with said motor means. This switch is preferably fixed upon the mounting bracket 17, and slidably supported on said mounting bracket is a switch actuator member or block 28, disposed in opposition to the switch 27. The switch actuator member or block preferably straddles the drive shaft 21, having a longitudinal opening or slot 29 through which the latter extends. A transverse shaft 30 is supported within and across the interior of the hood 10 above the switch actuator member or block 28, and the latter is provided with rack teeth 31 which are adapted to mesh with pinions 32 on said shaft 30. To actuate the closure member 16 another transverse shaft 33 is supported within and across the interior of the hood 10 beneath and adjacent to the passageway 15. The opposite ends of the closure member 16, which are suitably slidably supported in connection with the top of the hood 10, are provided, in connection with their undersides, with toothed rack portions 34 adapted to mesh with pinions 35 on the shaft 33.

The shafts 30 and 33 are adapted to be actuated by a manipulatable rackwork which includes a drive pinion 36 on the shaft 30, one of the drive pinions 35 on the shaft 33, a rack piece 38 having a lower rack arm 39 to engage and drive the pinion 36 of shaft 30, and an upper rack arm 40 to engage and drive a pinion 35 of shaft 33. The rack arms 39 and 40 slidably extend through the hood back board 12, and affixed to the rack piece 38, to slidably extend rearwardly through the cowl wall 14 into the interior of the automobile body, is a push and pull control rod 41 subject to manipulation by an automobile occupant.

To start operation of the wiper mechanism, the control rod 41 is pulled out, thereby moving the rack piece 38 and its rack arms 39 and 40 rearward. The upper rack arm 40, through one of the drive pinions 35, rotates the shaft 33 and its pinions 35 in counterclockwise direction, whereby said pinions 35 so move the overlying rack portions 34 as to impart forward sliding movement to the closure member 16, thus opening the passageway 15 (see Fig. 8). The lower rack arm 39, through the drive pinion 36, rotates the shaft 30 and its pinions 32 also in counterclockwise direction, whereby said pinions 32, through the underlying rack teeth 31 of the switch actuator member or block 28 engaged thereby, impart a rearward movement to said switch actuator member or block 28, thereby causing the latter to engage and close the switch 27, thus starting operation of the wiper mechanism (again see Fig. 8). The position and extent of the teeth of the upper rack arm 40 relative to the position and extent of the teeth of the lower rack arm 39 is such as to open the closure member 16 before the switch actuator block completes its rearward movement and closes the switch 27.

To stop operation of the wiper mechanism, the control rod 41 is pushed in, whereupon a reversal of the above described rackwork movement is produced, whereby to first open the switch 27 to stop wiper blade member revolution, and then to move the closure member 16 to its passageway 15 closing position (see Fig. 9).

Figure 1:
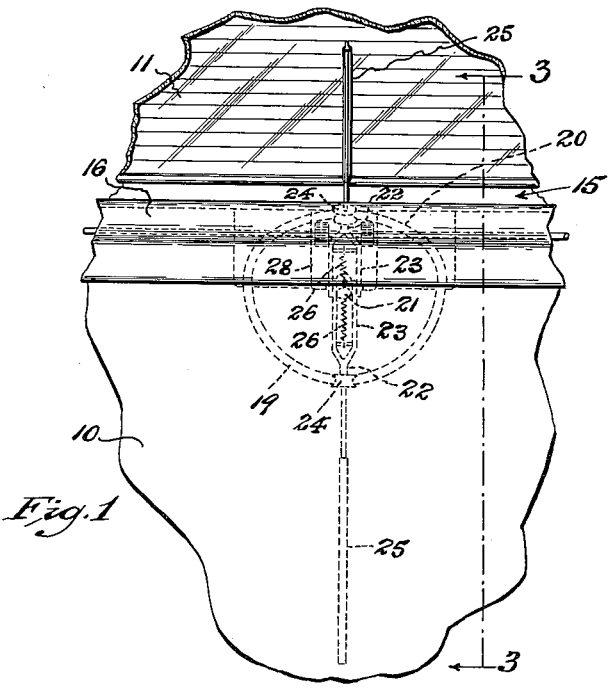
Fig. 1 is a fragmentary plan view showing the closure between the automobile hood and windshield open and the wiper mechanism in operation.
Figure 2:
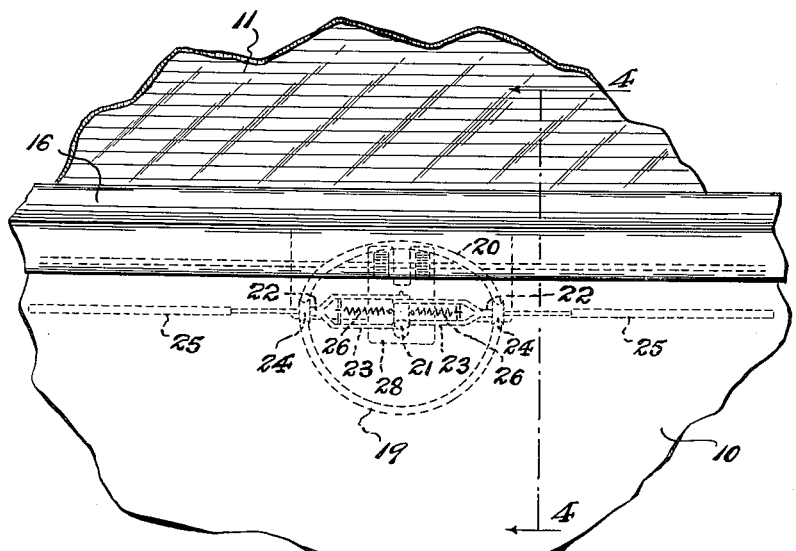
Fig. 2 is a similar view showing said closure closed and the wiper mechanism in stopped condition and concealed within the interior of the automobile hood.

It is desirable to provide means for arresting the stopped wiper blade members in a predetermined position within the interior of the hood 10. One illustrative means adapted to attain this end comprises the provision of brake or stop means in connection with the switch actuator member or block 28, and means on the drive shaft 21 for cooperation therewith. Such illustrative means is shown in Figs. 5 and 6, and comprises yieldable brake or stop springs 42, which are mounted in the side walls of the opening or slot 29 in the switch actuator member or block, and brake or stop spring engageable indentations or notches 43 which are provided at the sides of the drive shaft 21 contiguous to the switch actuator member or block; said indentations or nuotches being aligned with the longitudinal axes of the lever arms 22 and the wiper blade members 25 carried thereby, in the stopped positions of these elements. When the operation of the wiper mechanism is stopped, by the time the switch actuator member or block 28 has been retracted to its normal initial position, the wiper blade members 25 will have been withdrawn into the interior of the hood 10, and the brake or stop springs 42 will then be opposed to the sides of the drive shaft 21. Under their resilient reaction, said brake or stop springs 42 will enter the indentation or notches 43 of the shaft 21, when said indentations or notches are opposed thereto. As this occurs, said brake or stop springs will arrest momentum of the shaft 21, thereby stopping the latter so as to dispose the lever arms 22 and the wiper blade members 25 carried thereby in a desired predetermined position, which position is preferably transverse to the hood 10, as shown in Figs. 2 and 4.

Although but one rotatable windshield wiper mechanism has been shown, it will be obvious that a plurality thereof may be employed to respectively cover left and right areas of the windshield 11; which areas can overlap if desired by so relatively arranging the wiper blade members of one wiper mechanism that the same are disposed and move in staggered and non-interforming relation to those of the other wiper mechanism.

It may also be pointed out that provision may be made for catching and draining away any water or spillage which may pass downward through the open passageway 15 during operation of the wiper mechanism. To this end, a transverse catch trough 44 can be mounted on the hood back board 12 beneath the passageway 15. Said catch trough may drain from one or both ends exteriorly of the hood 10.

It will be understood that various changes and modifications of the above described illustrative embodiment of this invention can be made without departing from the scope of the invention as defined by the herefollowing claims.

Having now described my invention, I claim:

1. In combination with the hood of an automotive vehicle, said vehicle having a windshield extending extending exteriorly of the hood in angular relation thereto, the hood having a passageway along the juncture of the windshield therewith, a closure member movable to open and close said passageway, windshield wiper mechanism comprising a guide track member formed by joined semi-circular half sections comprising a forward half section disposed beneath the hood top in a plane substantially parallel to the latter and a rearward uptilted half section disposed in a plane substantially parallel to the windshield, means to support said guide track member within the hood adjacent to said passageway, a shaft adapted to be driven by an electric motor, said shaft extending centrally through the guide track member, wiper blade means adapted to be continuously revolved by said shaft for movement upon and around said guide track member, whereby the revolved wiper blade means is adapted to pass through the open passageway so as to make wiping contact with the windshield, a motor circuit control switch, a movable switch actuator means opposed to said switch, manually operable means to move said switch actuator means to and from closing engagement with said switch to start and stop operation of the wiper blade means, means also controlled by said manually operable means whereby to open and close said closure means in timed relation to the closing and opening of said control switch, said switch actuator means being supported to move transverse to the axis of the driven shaft, stop spring means supported by the switch actuator means and adapted, in the normal initial retracted position of the latter, to oppose said shaft, and said shaft having an indentation in a side thereof to receive the stop spring means when operation of the wiper blade means is discontinued, whereby to stop the latter in a predetermined position within the interior of the hood.

2. In combination with the hood of an automotive vehicle said vehicle having a windshield extending exteriorly of the hood in angular relation thereto, the hood having a passageway along the juncture of the windshield therewith, a closure member for said passageway, windshield wiper mechanism comprising a guide track member formed by joined semi-circular half sections comprising, a forward half section disposed in a plane substantially parallel to the hood top and a rearward uptilted half section disposed in a plane substantially parallel to the windshield means to support said guide track member within the hood adjacent to said passageway, a shaft adapted to be driven by an electric motor, said shaft extending centrally through the guide track member, wiper blade means adapted to be continuously revolved by said shaft for movement upon and around said guide track member, whereby the revolved wiper blade means is adapted to pass through the open passageway so as to make wiping contact with the windshield, a motor circuit control switch, a movable switch actuator means opposed to said switch, rack and pinion means operable to open and close the closure member, a transverse shaft to support the pinions of said rack and pinion means, a second rack and pinion means operable to move the switch actuator means to and from closing engagement with the switch to start and stop operation of the wiper blade means, a second transverse shaft to support the pinions of said second rack and pinion means, a drive pinion on said second transverse shaft, and a manually operable rackwork having a rack arm to engage a pinion of the first rack and pinion means and a second rack arm to engage the drive pinion of said second rack and pinion means; said rack arms being relatively disposed so as to effect opening of the closure member prior to completion of switch closing movement of the switch actuator means when the rackwork is operated to start operation of the wiper blade means and to reverse this sequence when said rackwork is operated to stop operation of the wiper blade means.

3. The combination according to claim 2 wherein the wiper blade means comprises at least one lever arm pivotally connected with the driven shaft, said lever arm having a guide roller to ride on and around the guide track member when the lever arm is revolved by said shaft, pull spring means connected between said shaft and the lever arm whereby to bias the latter and its guide roller toward the guide track member, and a wiper blade member extending outwardly from the free end of said lever arm.

4. The combination according to claim 2 wherein the switch actuator means is supported to move transverse to the axis of the driven shaft, stop spring means supported by the switch actuator means and adapted, in the normal initial retracted position of the latter, to oppose said shaft, and said shaft having an indentation in a side thereof to receive the stop spring means when operation of the wiper blade means is discontinued, whereby to stop the latter in a predetermined position within the interior of the hood.

References Cited in the file of this patent
UNITED STATES PATENTS

| | | |
|---|---|---|
| 2,161,682 | Rogers | June 6, 1939 |
| 2,235,493 | Dobkin | Mar. 18, 1941 |
| 2,401,961 | Rappl | June 11, 1946 |
| 2,634,447 | Domek | Apr. 14, 1953 |
| 2,641,661 | Puermer | June 9, 1953 |
| 2,721,352 | Oishei | Oct. 25, 1955 |
| 2,759,214 | Madunich | Aug. 21, 1956 |
| 2,799,039 | Oishei | July 16, 1957 |